US011180176B2

(12) United States Patent
Coley

(10) Patent No.: US 11,180,176 B2
(45) Date of Patent: Nov. 23, 2021

(54) STEERING WHEEL COVER

(71) Applicant: Coley Creative LLC, New York, NY (US)

(72) Inventor: Ann D. Coley, New York, NY (US)

(73) Assignee: Coley Creative LLC, New York, NY (US)

( * ) Notice: Subject to any disclaimer, the term of this patent is extended or adjusted under 35 U.S.C. 154(b) by 486 days.

(21) Appl. No.: 14/928,477

(22) Filed: Oct. 30, 2015

(65) Prior Publication Data

US 2017/0120845 A1    May 4, 2017

(51) Int. Cl.
*B62D 1/06*    (2006.01)

(52) U.S. Cl.
CPC ...................... *B62D 1/06* (2013.01)

(58) Field of Classification Search
CPC .. B62D 1/06; B62D 1/065; B62D 1/04; Y10T 74/2087; Y10T 74/20876
See application file for complete search history.

(56) References Cited

U.S. PATENT DOCUMENTS

| | | | | |
|---|---|---|---|---|
| 1,446,628 A * | 2/1923 | Ridge | ...................... | B62D 1/06 74/558 |
| 1,987,599 A | 1/1935 | Bennett | | |
| 1,997,738 A * | 4/1935 | Maxedon | ................. | B62D 1/06 74/558 |
| 2,078,059 A * | 4/1937 | Churchill | ................. | B62D 1/06 16/DIG. 12 |
| 2,157,950 A * | 5/1939 | Best | ......................... | B62D 1/06 74/558 |
| 2,226,866 A * | 12/1940 | Lipschultz | ............... | B62D 1/06 152/189 |
| 2,491,803 A * | 12/1949 | De Heras | ................. | B62D 1/06 74/558 |
| 2,601,881 A | 7/1952 | Oberlin, Sr. | | |
| 3,945,416 A | 3/1976 | Rim | | |
| 4,102,377 A | 7/1978 | Ostrem | | |
| 4,800,776 A | 1/1989 | Strongwater | | |
| 5,042,318 A * | 8/1991 | Franz | ........................ | B62D 1/06 428/172 |
| 5,343,776 A * | 9/1994 | Falco | ........................ | B25G 1/01 428/34.1 |
| D364,137 S * | 11/1995 | Rigel | ............................ | D12/177 |

(Continued)

FOREIGN PATENT DOCUMENTS

| | | | | |
|---|---|---|---|---|
| DE | 2753174 A1 * | 6/1979 | ................ | B62D 1/06 |
| GB | 2069871 A * | 9/1981 | ................ | C09J 7/045 |

OTHER PUBLICATIONS

EPO Translation of DE 2753174 A1, Horn, Jun. 7, 1979. (Year: 2019).*

*Primary Examiner* — Daniel D Yabut
(74) *Attorney, Agent, or Firm* — Florek & Endres PLLC

(57) ABSTRACT

A disposable steering wheel cover for protecting the driver from transfer of germs, viruses and/or bacteria on a steering wheel while also allowing the driver to safely operate the vehicle without risk of slipping of the cover, having an annular member of a water-impermeable, light weight and disposable material with at least one elastic element running along at least a portion of an edge of the annular member for securing the cover in place around the rim of the steering wheel, and one or more gripping elements on the inner surface of the member for providing a non-slip grip on the wheel.

12 Claims, 5 Drawing Sheets

(56) References Cited

U.S. PATENT DOCUMENTS

| | | | |
|---|---|---|---|
| 5,743,154 A | 4/1998 | Jacinth | |
| 7,380,479 B2* | 6/2008 | Landy | B62D 1/06 |
| | | | 74/558 |
| 2006/0210062 A1* | 9/2006 | DeMichele | H04M 1/17 |
| | | | 379/451 |
| 2009/0096261 A1* | 4/2009 | Abraham | B60N 2/60 |
| | | | 297/228.1 |
| 2014/0053679 A1* | 2/2014 | He | B62D 1/06 |
| | | | 74/558 |
| 2014/0159404 A1* | 6/2014 | Aly | B25G 1/102 |
| | | | 294/141 |
| 2015/0107756 A1* | 4/2015 | Lee | B29C 35/02 |
| | | | 156/110.1 |
| 2015/0217794 A1* | 8/2015 | Kong | B62D 1/06 |
| | | | 74/558 |

* cited by examiner

STEERING WHEEL COVER

FIELD OF THE INVENTION

The present invention relates to the field of covers for steering wheels, more particularly to the field of disposable steering wheel covers used to protect against the transfer of germs between the surface of the steering wheel and the driver.

BACKGROUND OF THE INVENTION

A steering wheel is generally made of a circular rim, which is grasped by a user, and a central hub that connects the steering wheel to the steering column. The rim of a steering wheel in a vehicle is inescapably handled by the driver whenever the vehicle is in operation. Consequently, the steering wheel is exposed to a significant amount of dirt, grime, and most importantly, disease-containing bacteria or viruses. This is particularly true when the vehicle is being operated by a third party such as a parking valet or a service person. It is widely known that many communicable germs and viruses can live on surfaces outside of the human body for fairly long periods of time, during which the germs are spread between individuals, transmitting diseases. As such, it has been determined that the problem of contamination and germ transfer can be mitigated by covering the steering wheel with a cover.

While several steering wheel covers already exist on the market, none of them are designed to provide drivers with a fully functional, inexpensive, disposable cover for use particularly when a vehicle is left with a third party driver. The majority of existing steering wheel covers generally fall into two categories: (1) covers intended for non-removable attachment to the steering wheel, that are left on the steering wheel when the steering wheel is in use and generally designed and used for the purpose of increasing a driver's physical comfort and maximizing the driver's grip on the steering wheel; and (2) steering wheel covers designed to be removed from the steering when the steering wheel is in use and are utilized primarily to protect the steering wheel from solar radiation damage, thermal damage and elevated temperatures. See generally, U.S. Pat. Nos. 4,800,776 and 4,102,377.

One example of a steering wheel cover directed to maintaining the cleanliness of a steering wheel, however, can be found in U.S. Pat. No. 2,601,881 which teaches a flexible sheet for placement over a round steering wheel, the sheet having end portions that fold downwardly and inwardly toward each other around the steering wheel to secure the sheet. A similar covering member can be found in U.S. Pat. No. 1,987,599 which relates to a steering wheel protector directed to use by an automobile mechanic of a repair shop, comprising an elongated rectangular pleated sheet of material, such as paper, folded over the steering wheel and fastened in place.

However, there is a need for a single steering wheel cover made of an inexpensive material suitable for disposal after each use, that provides an effective clean barrier between the steering wheel surface and any contaminants that may be on the hands of the driver, and designed to allow for safe operation of the vehicle while the cover is applied. There is also a need for a steering wheel cover that can be conveniently collapsed and packed in bulk for single use.

SUMMARY OF THE INVENTION

In order to overcome the shortcomings of the prior art, the present invention is provided as a disposable steering wheel cover made of an inexpensive material that is substantially impervious to various types of impurities that will simultaneously provide the user with a clean gripping surface and guard the steering wheel against contamination. The presently claimed steering wheel cover is particularly suitable for use when the vehicle is left with a third party for valeting or service, where the owner of the vehicle does not need to fear soiling of the steering wheel and the third party has a quick and sanitary gripping surface for operating the vehicle.

There is frequently a trade-off in the advantages between the ease of mounting of the steering wheel cover and the safety requirements of ensuring that the cover does not slide along the steering wheel when applied. It is therefore one object of the present invention to create a readily applied disposable steering wheel cover that effectively minimizes the problem of germ transmittal while also allowing for full functionality of the steering wheel without sacrificing safety. It is a further object of the invention to create a compact, collapsible cover that provides the advantages of portability and multiple-dispensability.

These and other objects are addressed by the present invention, directed to a disposable steering wheel cover adaptable to fit a variety of different sized steering wheels. The disposable steering wheel cover of the present invention is an advantage over the prior art in that it is simply constructed and easily removable from the steering wheel for quick disposal after single uses, ensuring that no pollutants are left on the steering wheel after operation. The present invention is further an improvement over the prior art in that it may limit slipping and/or twisting of the cover on the steering wheel while it is attached to the steering wheel, thus permitting the user to safely operate the vehicle while the cover is protecting the wheel from contamination.

More particularly, the present invention is directed to a disposable steering wheel cover comprising a substantially annular member having an open bottom portion enabling the substantially annular member to be removably fitted over the rim of a vehicle's steering wheel, said annular member comprising:

a. an elastic member running longitudinally along at least a portion of the edge of the annular member for securing the covering on the wheel; and b. one or more gripping elements on at least a portion of an inner surface of the annular member to prevent slipping.

In the preferred embodiment, the material of the annular member should be in the form of a sheet having a shape and size adapted to overlie and fit various-sized steering wheels of up to 16 inches in diameter, the sheet being formed preferably of a flexible material. It is further preferred that the material be lightweight and inexpensive, suitable for convenient transport, use, and disposal. Examples of suitable materials may include, but are not limited to single, coated or multi-layer materials comprising medical weight tissue or polymer materials, such as polyethylene, polypropylene, polyurethane, rayon, nylon, TYVEK® (flash-spun nonwoven high-density polyethylene fiber), spandex, SMS (spun-melt-spun), fabrics, or natural or synthetic rubber or latex materials, with spun or non-woven polypropylene material being preferred.

The sheet is preferably cut in a rectangular shape and connected at the ends to form an annular shape, having a length dimensioned for distension of the elastic member for installation around a steering wheel rim and a width dimensioned for wrapping around said rim. Alternatively, the sheet can be continuous, forming a circular structure, such that there are no "ends" to be connected.

Generally, for a standard steering wheel having a diameter of about 14 inches to about 16 inches and a thickness of about 1 inch to about 2 inches, an annular member having a circumference of about 47 inches to about 57 inches, and preferably about 50 inches, and a width of about 2 inches to about 4 inches, and preferably about 3 inches, would be suitable, without limitation.

The elastic member of the preferred embodiment preferably comprises a loop and most preferably includes two elastic loop members that run along the opposed perimeters of the annular member and stretch from a smaller diameter to a larger diameter, allowing the cover to be expanded and placed around the rim of different sized steering wheels. Upon installation of the cover over the rim of the steering wheel, releasing the elastic members contracts and gathers the edges of the annular member so that the steering wheel cover hugs the rim of the steering wheel for a secure fit.

The presently claimed steering wheel cover therefore does not require laces, snaps or other fastening means as required in certain prior art covers, nor does it require adhesive to secure it to the steering wheel as required in still other prior art covers. The claimed cover is held in place solely by the contraction of the elastic members around the rim of the steering wheel.

Additionally, the gripping element on the inner surface of the steering wheel cover preferably comprises a plurality of scattered gripping elements. This feature helps to prevent the slipping and/or twisting of the cover on the wheel and allows the driver continue safely operating the vehicle when the cover is applied.

In an alternative embodiment, the elastic member and the gripping element can be integral with the annular member. For example, the annular member can be an expandable material with natural gripping characteristics, such as a continuous band of an elastomeric material.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
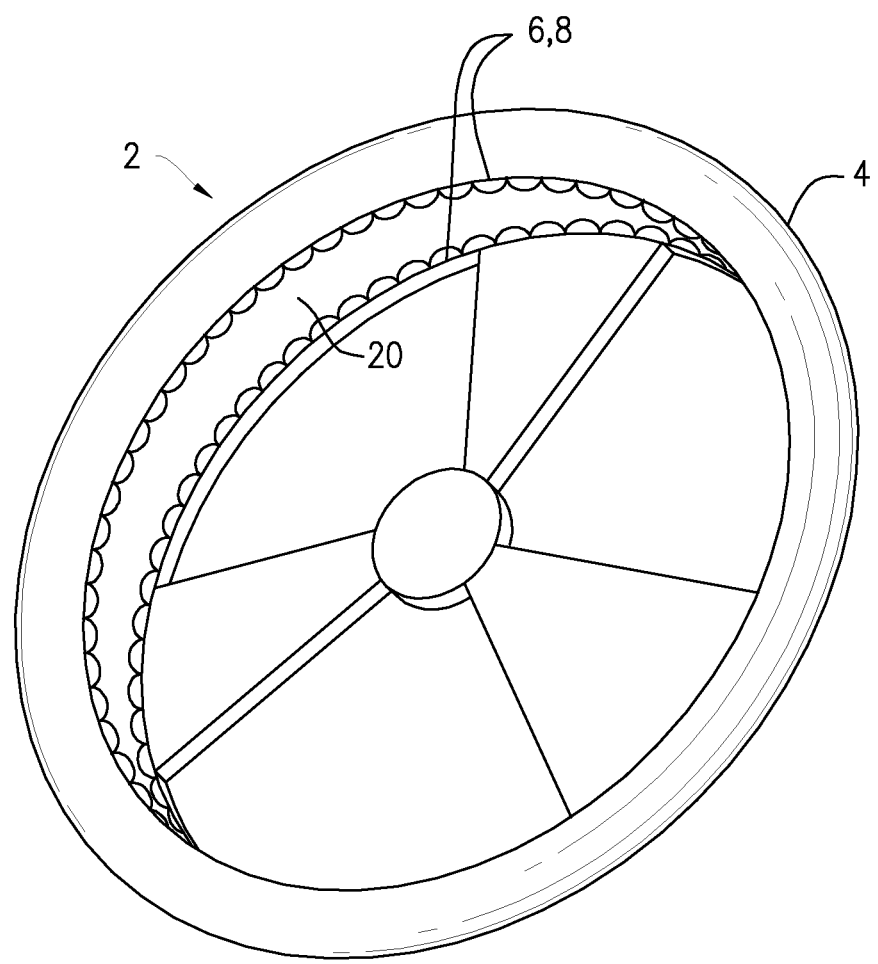
FIG. 1 is a perspective view of a preferred embodiment of the disposable steering wheel cover of the present invention on a steering wheel.
Figure 2:
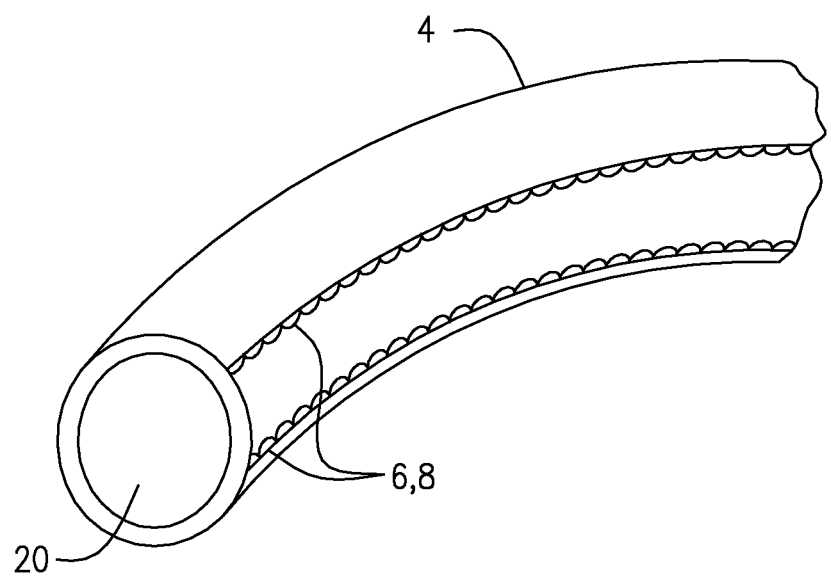
FIG. 2 is a partial cross sectional view of the steering wheel cover placed on a steering wheel.
Figure 3:
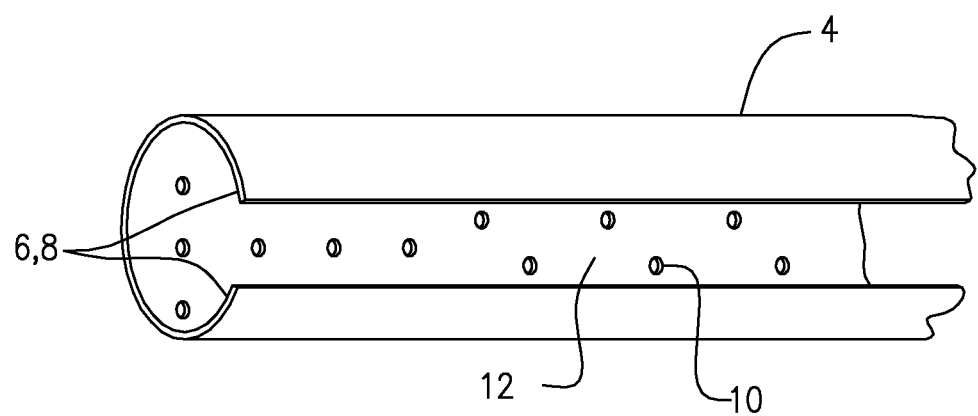
FIG. 3 is a partial perspective view of the inner surface of the steering wheel cover, displaying a preferred gripping member.

As shown in the drawings, namely FIGS. 1, 2, and 3, the present invention is directed to a disposable steering wheel cover 2, comprising a substantially annular member 4 having an open bottom portion enabling the substantially annular member 4 to be removably fitted over the rim 20 of a vehicle's steering wheel. The substantially annular member 4 preferably comprises a pair of elastic loop members 6, 8 attached longitudinally along at least a portion of each edge for securing the covering around the rim 20 of the steering wheel. The substantially annular member 4 also comprises one or more gripping elements 10 on at least a portion of the inner surface to prevent the cover 2 from slipping on the wheel and allowing for improved safety in operation of the vehicle.

The substantially annular member 4 of the steering wheel cover 2 is preferably made of a water-resistant, lightweight material that is substantially impervious to contaminants and can be compacted to a small volume when not in use. Examples of suitable lightweight materials include non-woven or spun polypropylene, polyethylene, polyurethane, nylon, rayon, spandex, SMS, TYVEK® (flash-spun nonwoven high-density polyethylene fiber), elastomeric materials such as natural or synthetic rubber or latex, coated papers or polymers and the like. It is also preferred that the material be an inexpensive and easily manufactured material, suitable for disposal after each use. Although any suitable material may be used for the annular member, in the most preferred embodiment, the cover is made of a lightweight spun-bound polypropylene material. This flexible and completely collapsible material achieves the object of creating a sterile surface through which germs cannot penetrate that is also easily stored in bulk for frequent, one-time and easy application.

The steering wheel cover 2 can be compacted to a substantially flat and/or scrunched relaxed state, allowing the steering wheel cover 2 to be conveniently stored, preferably in bulk, and easily dispensed. From the relaxed state, the elastic members 6, 8 may be stretched to an extent so that the substantially annular member 4 extends around the rim 20 of the steering wheel. In this state, the lateral edges extend inwardly towards each other due to the elastic effect of the elastic members 6, 8 being placed in tension, thereby allowing the cover to grip the steering wheel to keep it in place. The two elastic loop members 6, 8 preferably stretch circumferentially to a diameter that will allow the cover to accommodate a variety of different sized steering wheels.

Of course, the length of elastic material may be modified to fit steering wheels of different sizes. The elastic material may be of any form containing elastic rubber strands, preferably covered with textile fabric, with enough tension to draw the edges of the annular member inwardly over the rim of the steering wheel. Alternatively, the elastic member 6 may be on only a portion of the circumference of the annular member without deviating from the spirit of this invention.

The preferred embodiment of the present invention further comprises a gripping member 10 on the inner surface of the steering wheel cover 2, to prevent the cover from shifting and/or sliding when it is placed on a vehicle's steering wheel. This feature allows a user to safely operate and steer the vehicle even when the cover is in place. As best seen in FIG. 3, it is preferred that the inner surface of the annular member 4 is lined with a gripping member 10 in the form of a plurality of elastomeric beaded elements placed on at least a portion of the inner surface of the annular member 4, and preferably on the entire inner surface. Such a gripping member 10 achieves the friction required to prevent movement or twisting of the cover 2 without adding substantial bulk or weight to the cover 2. However, any suitable tacky or rubberized material for creating friction between the annular member 4 and the steering wheel may be used; for example, a strip of latex, an entire layer of a gripping element, a strip or layer of elastomeric material 12, a light adhesive that does not leave residue, or the like may be used.

Figure 4:
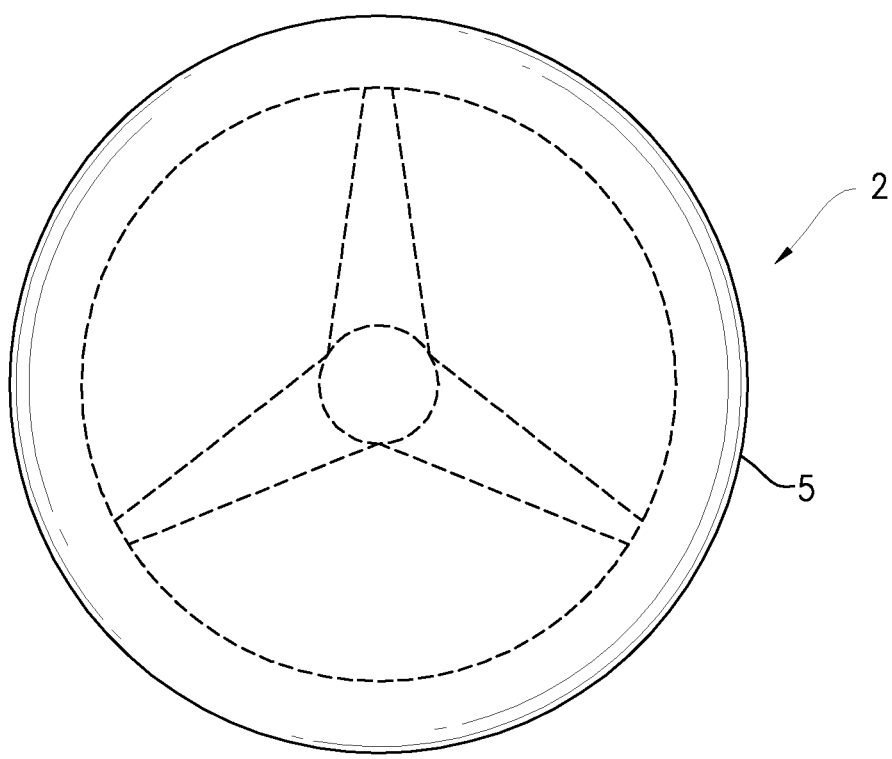
FIG. 4 is a perspective front view of another preferred embodiment of the steering wheel cover, wherein the entire axial area of the steering wheel is covered.
Figure 5:
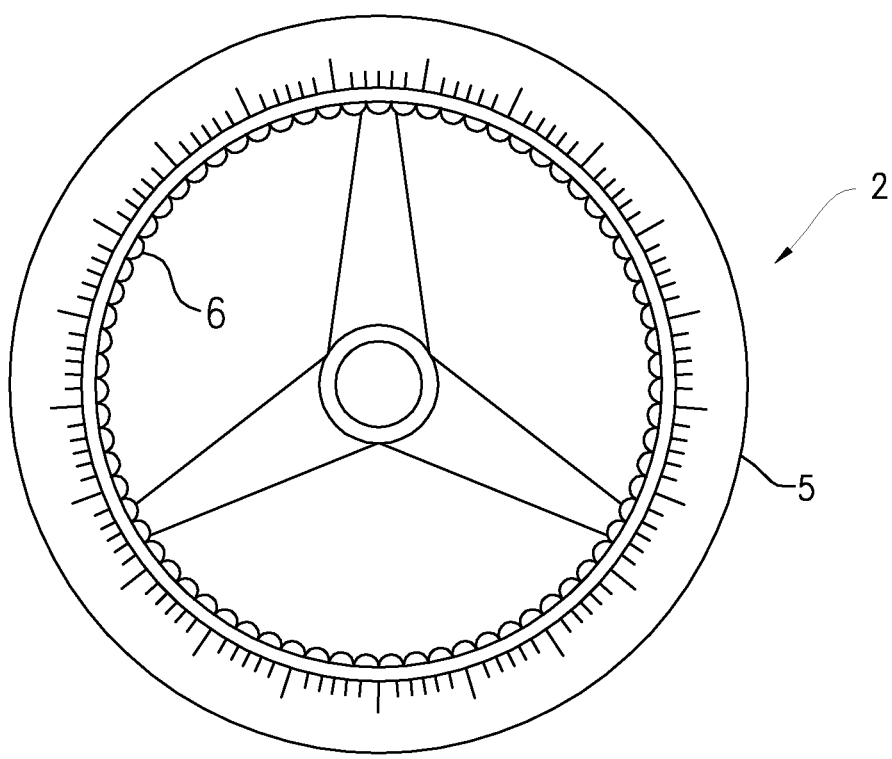
FIG. 5 is a perspective rear view of another preferred embodiment of the steering wheel cover, wherein the entire axial area of the steering wheel is covered.

In an alternative preferred embodiment, as shown in FIGS. 4 and 5, the disposable steering wheel cover 2 preferably comprises an annular member in the form of a circular member 5 with an open bottom portion that permits the circular member 5 to be removably fitted over the rim 20 of a steering wheel. The circular member 5 is preferably of sufficient size to substantially cover the entire axial area of the steering wheel when in a stretched state, and is preferably made of the same water-resistant and lightweight materials as the annular member 4. A single elastic loop member 6 is attached at least around a portion of the peripheral edge of the circular member 5 for securing the member 5 around the rim 20 of the wheel for use.

The elastic loop member 6 preferably stretches circumferentially to allow the cover 2 to fit around a variety of different sized steering wheels, and contracts inwardly over the rim 20 of the steering wheel to snugly grip the wheel. When in place over a steering wheel, the circular member 5 fits snugly over the steering wheel and forms a substantially smooth circular surface on the axial face of the steering wheel.

This alternative preferred embodiment similarly comprises a gripping member 10 on at least a portion of the inner surface of the steering wheel cover 2 to prevent the cover from sliding around the wheel when it is in place. Most preferably, the gripping member 10 for this alternative embodiment is located or concentrated on the inner surface at the peripheral edge of the circular member 5, where the inner surface of the circular member is in contact with the steering wheel.

In a second alternative preferred embodiment, the steering wheel cover comprises a continuous elastic band, such as a natural or synthetic latex or rubber band, whereby the band has the above described dimensions so as to be wide enough for the edge portions to contract inward a substantial distance to surround the steering wheel rim. The contractile properties of the elastic help to secure the steering wheel cover around the rim 20 of the wheel, permitting longitudinal and/or circumferential stretching of the cover to fit various sizes of steering wheels. This second alternative embodiment therefore inherently includes the elastic loop member(s) and the gripping member as integral components of the annular member 4. Of course, this embodiment contemplates the use of alternative materials with similar contractile properties, such as rubber, vinyl, neoprene and the like.

Variations modifications and alterations to the preferred embodiment of the present invention described above will make themselves apparent to those skilled in the art. All such changes are intended to fall within the spirit and scope of the present invention, limited solely by the appended claims.

Any and all patents and/or patent applications referred to herein are hereby incorporated by reference.

I claim:

1. A disposable steering wheel cover, comprising,
   an annular member comprising a single, coated or multi-layer material selected from the group consisting of a medical weight tissue, a spun or nonwoven polymer material and combinations thereof, said annular member having a length dimensioned for extending around an outer diameter of a steering wheel and a width dimensioned for wrapping around at least a portion of a grip circumference of the steering wheel,
   an elastic member running longitudinally along at least a portion of at least one side edge of the annular member for radial distension around the outer diameter of the steering wheel, to hold the annular member in place around the steering wheel, and
   one or more non-slip elements on at least a portion of an interior of the annular member to prevent sliding of the steering wheel cover on the steering wheel,
   wherein the at least a portion of at least one side edge of the annular member contracts and gathers when the elastic member is released and the steering wheel cover is collapsible to a compacted state for storage in bulk and dispensing when not on the steering wheel.

2. The disposable steering wheel cover of claim 1 wherein the circumference of the cover is from about 47 inches to about 57 inches.

3. The disposable steering wheel cover of claim 1 further comprising a second elastic member about a second side edge of the annular member.

4. The disposable steering wheel cover of claim 1 wherein the elastic member is a loop of elastic material.

5. The disposable steering wheel cover of claim 3 wherein the elastic member and the second elastic member each comprise a loop of elastic material.

6. The disposable steering wheel cover of claim 1 wherein the one or more non-slip elements comprise a plurality of gripping elements.

7. The disposable steering wheel cover of claim 1 wherein the one or more non-slip elements comprise a strip or layer of elastomeric material.

8. The disposable steering wheel cover of claim 1 wherein the one or more non-slip elements comprise a plurality of elastomeric beaded elements disposed on at least a portion of the interior of the annular member.

9. The disposable steering wheel cover of claim 1 wherein the material of the annular member is formed of a sheet having a shape and size adapted to overlie and fit various-sized steering wheels of up to 16 inches in diameter.

10. The disposable steering wheel cover of claim 1 wherein the annular member is of sufficient size to substantially cover an entire axial area of the steering wheel when in a stretched state.

11. The disposable steering wheel cover of claim 1 wherein the single, coated or multi-layer material of the annular member comprises a spun or nonwoven polypropylene or polyethylene material.

12. The disposable steering wheel cover of claim 1, wherein the steering wheel cover is collapsible to a scrunched relaxed state when no on a steering wheel.

* * * * *